United States Patent [19]

Kono et al.

[11] Patent Number: 4,490,751
[45] Date of Patent: Dec. 25, 1984

[54] APPARATUS FOR RECORDING AND/OR REPRODUCING VIDEO AND AUDIO SIGNALS

[75] Inventors: Takashi Kono, Hachiouji; Shinji Kakuyama, Higashimurayama; Toshimitsu Kamai, Higashikurume, all of Japan

[73] Assignee: Sony Corporation, Tokyo, Japan

[21] Appl. No.: 447,875

[22] Filed: Dec. 8, 1982

[30] Foreign Application Priority Data

Dec. 11, 1981 [JP] Japan .............................. 56-199755

[51] Int. Cl.³ ............................................ H04N 9/493
[52] U.S. Cl. .................................. 358/330; 358/343; 360/19.1
[58] Field of Search ............... 358/310, 315, 327, 330, 358/340, 343, 328; 360/18, 19.1, 20, 21, 30

[56] References Cited

U.S. PATENT DOCUMENTS

| | | | |
|---|---|---|---|
| 3,830,968 | 8/1974 | Redlich | 358/343 |
| 4,007,482 | 2/1977 | Amari | 358/328 |
| 4,007,484 | 2/1977 | Amari | 358/328 |
| 4,208,671 | 6/1980 | Ozawa | 358/330 |
| 4,353,090 | 10/1982 | Broadbent | 358/343 |
| 4,453,186 | 6/1984 | Watatani | 360/19.1 |

*Primary Examiner*—Michael A. Masinick
*Attorney, Agent, or Firm*—Lewis H. Eslinger; Alvin Sinderbrand

[57] ABSTRACT

A video and audio signal recording apparatus includes first and second frequency-modulators in which a first audio signal, for example, a stereophonic left signal, modulates a first carrier and a second carrier with a frequency higher than that of the first carrier so as to provide first and second FM audio signals, respectively, third and fourth frequency-modulators in which a second audio signal, for example, the stereophonic right signal, modulates a third carrier with a frequency higher than that of the second carrier and a fourth carrier with a frequency higher than that of the third carrier so as to provide third and fourth FM audio signals, respectively, a first mixing circuit for mixing the first and third FM audio signals with a video signal, such as, a composite color video signal having a frequency modulated luminance component signal in a frequency band separated from the band of a frequency-converted chrominance component signal so as to provide an interval therebetween for accommodating the first through fourth FM audio signals, a second mixing circuit for mixing the second and fourth FM audio signals with the video signal, and first and second magnetic heads having different azimuth angles and respectively receiving first and second mixed audio and video signals from the first and second mixing circuits, respectively, for recording of such first and second mixed signals in record tracks which are adjacent each other on a magnetic record medium.

32 Claims, 18 Drawing Figures

APPARATUS FOR RECORDING AND/OR REPRODUCING VIDEO AND AUDIO SIGNALS

BACKGROUND OF THE INVENTION

1. Field of the Invention

This invention relates generally to an apparatus for magnetically recording and/or reproducing video and audio signals, such as may constitute a television signal, and more particularly is directed to improvements in the recording and/or reproducing of the audio signal in such an apparatus.

2. Description of the Prior Art

In video tape recorders according to the prior art for recording a color television signal on a magnetic tape, the chrominance and luminance signal components which constitute the color video signal are separated, and the chrominance signal component has its carrier frequency converted to a relatively low value, while the luminance component frequency modulates a relatively high frequency carrier, whereupon the frequency-converted chrominance signal component and the high side band of the frequency-modulated modulated luminance signal component (hereinafter simply referred to as the "FM modulated luminance signal component") are mixed or combined to form a composite color video signal which is recorded on a magnetic tape in successive, parallel record tracks extending obliquely in respect to the longitudinal or running direction of the magnetic tape. In such existing system for recording a color television signal, the audio signal thereof is recorded on the magnetic tape in record tracks which extend in the longitudinal direction, that is, the running direction of the magnetic tape, and are hereinafter referred to simply as "audio tracks".

In the above described recording system of the prior art, the oblique or slant tracks which are skewed relative to the tape and in which the composite color video signal, that is, the frequency-converted chrominance signal component and the frequency-modulated luminance signal component, is recorded, are formed by first and second substantially diametrically opposed rotary magnetic heads both supplied with the composite color video signal and alternately scanning the magnetic tape along a path at an angle to the longitudinal direction in which the tape is transported. In order to increase the recording density of the color video signal on the tape and thereby increase the duration of the recording, it has been known to restrict the speed at which the magnetic tape is transported so that the successive slant tracks scanned by the rotary magnetic heads will be closely or immediately adjacent to each other, that is, so that the space or so-called guard band between the adjacent slant tracks will be eliminated. However, in such case, the problem of "cross talk" arises in the reproducing or playback mode of the apparatus. In other words, during reproducing or playback, a transducer or head scanning one of the slant tracks for reproducing the composite color video signal recorded therein will also pick up or reproduce signals or cross talk from the next adjacent tracks.

The problem of cross talk has been substantially solved, at least in respect to the relatively high frequency frequency-modulated luminance signal component of the recorded composite color video signal, by providing the first and second rotary magnetic heads with different azimuth angles so that the composite color video signal will be recorded in each slant track by means of a magnetic head having an azimuth angle different from the azimuth angle of the head with which the composite color video signal is recorded in the next adjacent tracks. Thereafter, during reproducing or playback, each slant track is scanned by the rotary magnetic head having the corresponding azimuth angle with the result that a substantial azimuth loss is experienced as to the relatively high frequency components of the cross talk from the adjacent tracks. Thus, the cross talk in respect to the frequency-modulated luminance signal component is substantially suppressed.

However, the azimuth loss effect is rather poor in respect to the low frequency band of the cross talk, that is, in respect to the frequency-converted chrominance signal component, so that other measures need to be taken for eliminating or minimizing the low-frequency component of the cross talk. For example, as disclosed in detail in U.S. Pat. No. 4,007,482, issued Feb. 8, 1977, and having a common assignee herewith, cross talk in respect to the frequency-converted chrominance signal component situated in a relatively low frequency band is substantially eliminated by recording the chrominance signal component with different first and second carriers in the adjacent tracks, respectively. Such first and second carriers modulated by the chrominance signal component recorded in adjacent tracks, respectively, may be distinguished from each other by their respective frequency and/or polarity characteristics so that, upon reproduction of the signal recorded in a particular track, the low frequency band of the cross talk from the tracks next adjacent thereto can be conveniently suppressed or eliminated by reason of the different frequency and/or polarity or phase characteristics of the respective carriers.

More specifically, as disclosed in the above identified patent, the chrominance signal component of the color video signal to be recorded may be frequency-converted so as to selectively produce first and second frequency-converted signals which, when considered instantaneously, have the same carrier frequency, but which differ from each other in their phase or polarity characteristics. In this case, each of the line areas or increments of one track may have recorded therein a frequency-converted chrominance signal component with a carrier of constant polarity, while, in the next adjacent tracks, the carrier of the frequency-converted chrominance signal component recorded therein reverses its polarity for successive line intervals. Such pattern of recording insures that, during playback or reproduction, cross talk effects can be minimized or eliminated. For example, during reproduction of the recorded signals, the reproduced signals of two successive line intervals may be added together by means of suitable delay means, for example, by a simple comb filter, to cancel out, or at least minimize cross-talk interference signals associated with the desired reproduced signals of the two successive line intervals.

However, in the above described system for recording and reproducing a color television signal, each of the audio signals thereof, for example, the stereophonic left and right signals, is supplied to a respective fixed head which is continuously in contact with the magnetic tape adjacent a longitudinal edge of the latter so that the stereophonic left and right signals are respectively recorded in audio tracks extending longitudinally along the magnetic tape.

It will be appreciated that, when high density recording of the color video signal in successive slant tracks on the tape is effected as described above, the rotational speed of the rotary magnetic heads is relied upon to provide the desired relatively high speed of each rotary magnetic head in respect to the magnetic tape for ensuring high quality recording of the color video signal in the slant or skewed tracks. However, for achieving the high density recording of the color video signal, the transport speed of the magnetic tape is necessarily quite low, for example, about 1.33 cm/sec. Thus, the relative velocity between the magnetic tape and the fixed heads which record the audio signals in the respective audio tracks is quite low with the result that the quality of the audio recording is deteriorated.

In order to solve the above problem associated with the recording of the audio signals, it has been proposed that the audio signals be frequency-modulated and then mixed with the composite color video signal to provide a mixed or combined signal supplied to the rotary magnetic heads for recording by the latter in the slant tracks. Although the foregoing proposal ensures that the relative speed of the rotary magnetic heads in respect to the magnetic tape will be sufficient to ensure that the recording quality of the audio signals will not be deleteriously affected by an inadequate head-to-tape speed, the reproduced audio signals are still of insufficient quality. More particularly, in the existing proposal for recording frequency-modulated audio signals along with the composite color video signal in the slant tracks on the magnetic tape, the frequency-modulated audio signals recorded in the next adjacent tracks have the same carrier frequency. Therefore, each audio signal reproduced from a particular track contains a zero beat interference due to the audio component of the cross talk from the adjacent tracks even though the level of such cross talk may be reduced by the previously mentioned azimuth loss.

OBJECTS AND SUMMARY OF THE INVENTION

Accordingly, it is an object of this invention to provide apparatus for recording and/or reproducing video and audio signals and which avoids the previously described problems associated with the apparatus of the prior art.

More specifically, it is an object of this invention to provide an apparatus for recording and/or reproducing video and audio signals, and which is capable of high density recording of the video signal as well as the high quality recording and reproducing of the audio signal or signals.

Another object of this invention is to provide an apparatus, as aforesaid, which can record and reproduce plural channels of audio signals, for example, stereophonic left and right signals, while effecting the high density recording of a video signal, and without deteriorating the qualities of either the audio or video signals.

Still another object of this invention is to provide an apparatus, as aforesaid, which, in its playback or reproducing mode, achieves sufficient separation of the plural channel audio signals from each other and the substantial avoidance or reduction of cross talk interference from audio signals recorded in adjacent tracks.

A still further object of the invention is to provide an apparatus for recording and/or reproducing video and audio signals, as aforesaid, and which is compatible with a conventional video and audio signal recording and reproducing apparatus in which each recorded audio signal is reproduced by a respective stationary head.

According to an aspect of this invention, a video and audio signal recording apparatus comprises frequency-modulating means for modulating first and second carriers by a first audio signal to be recorded, for example, by a stereophonic left signal, thereby providing first and second FM audio signals, respectively, and for modulating third and fourth carriers by a second audio signal to be recorded, for example, by a stereophonic right signal, thereby providing third and fourth FM audio signals, respectively, with such first, second, third and fourth carriers all having different respective frequencies, first mixing means for mixing, with a video signal, two of the FM audio signals which represent the first and second audio signals to be recorded, respectively, and thereby providing a first mixed audio and video signal, second mixing means for mixing the other two of the FM audio signals with the video signal and thereby providing a second mixed audio and video signal, and first and second magnetic heads having different azimuth angles and respectively receiving the first and second mixed audio and video signals for recording said first and second mixed signals in respective record tracks which are adjacent each other on a magnetic record medium.

In a preferred embodiment of the invention, the respective frequencies of the first, second, third and fourth carriers of the FM audio signals mentioned above have successively increased values, the two FM audio signals mixed with the video signal in the first mixing means for providing the first mixed audio and video signal are the first and third FM audio signals, and the other two FM audio signals mixed with the video signal to provide the second mixed audio and video signal are the second and fourth FM audio signals.

Further, in the preferred embodiment of this invention, when the video signal to be recorded is a color video signal including luminance and chrominance components, the luminance component frequency-modulates an additional carrier having a frequency substantially higher than that of all the carriers of the FM audio signals so that the resulting FM luminance signal is in a band above the band containing the first through fourth FM audio signals, and the chrominance component is frequency converted to a relatively low frequency band spaced from the band of the FM luminance signals for providing a gap therebetween in which all of the FM audio signals are situated.

In order to provide compatability with apparatus according to the prior art for recording and reproducing video and audio signals, an apparatus according to this invention further has, as a feature thereof, fixed magnetic heads disposed adjacent the record medium in the form of a magnetic tape and respectively receiving the first and second audio signals to be recorded in respective longitudinal tracks along the tape. In this case, the application of the FM audio signals to the first and second mixing means for mixing therein with the video signal may be selectively interrupted, whereupon the audio signals are then only recorded in the longitudinal tracks along the tape. Further, it is a feature of the recording apparatus according to this invention that, when the audio signals are recorded only in the longitudinal tracks, the carrier of the FM luminance signal has its frequency shifted downwardly for closing the gap between the frequency bands of the FM luminance signal and the frequency-converted chrominance signal which comprise the composite video signal recorded in the parallel slant or skewed tracks on the magnetic tape.

When reproducing video and audio signals recorded as first and second mixed signals, as aforesaid, with different azimuth angles in adjacent first and second parallel tracks, respectively, on a magnetic record medium, it is another aspect of this invention to scan such adjacent first and second tracks by means of first and second magnetic heads having corresponding azimuth angles so as to alternately reproduce the first and second mixed signals, to separate the respective FM audio signals from the reproduced first and second mixed signals, to frequency-demodulate the FM audio signals separated from the first and second mixed signals and thereby obtain respective alternately reproduced demodulated portions of the first and second audio signals, and then to sequentially combine the alternately reproduced demodulated portions of the first and second audio signals for providing substantially continuous demodulated first and second audio signals.

In thus reproducing video and audio signals in accordance with a preferred embodiment of the invention, the combining of the alternately reproduced portions of the first and second audio signals is effected after the frequency-demodulation thereof so as to minimize the relative deviations at the transitions between the alternately reproduced portions of the respective audio signals. Further, it is a feature of this invention to pass the combined demodulated alternately reproduced portions of the audio signals through de-emphasis means having low-pass filter means for smoothing the transitions between the combined demodulated portions of the first audio signal and of the second audio signal.

The above, and other objects, features and advantages of the present invention, will be apparent from the following detailed description of an illustrative embodiment which is to be read in conjunction with the accompanying drawings in which the same reference numerals identify the corresponding elements and parts in the several views.

DESCRIPTION OF A PREFERRED EMBODIMENT

Figures 1, 2:
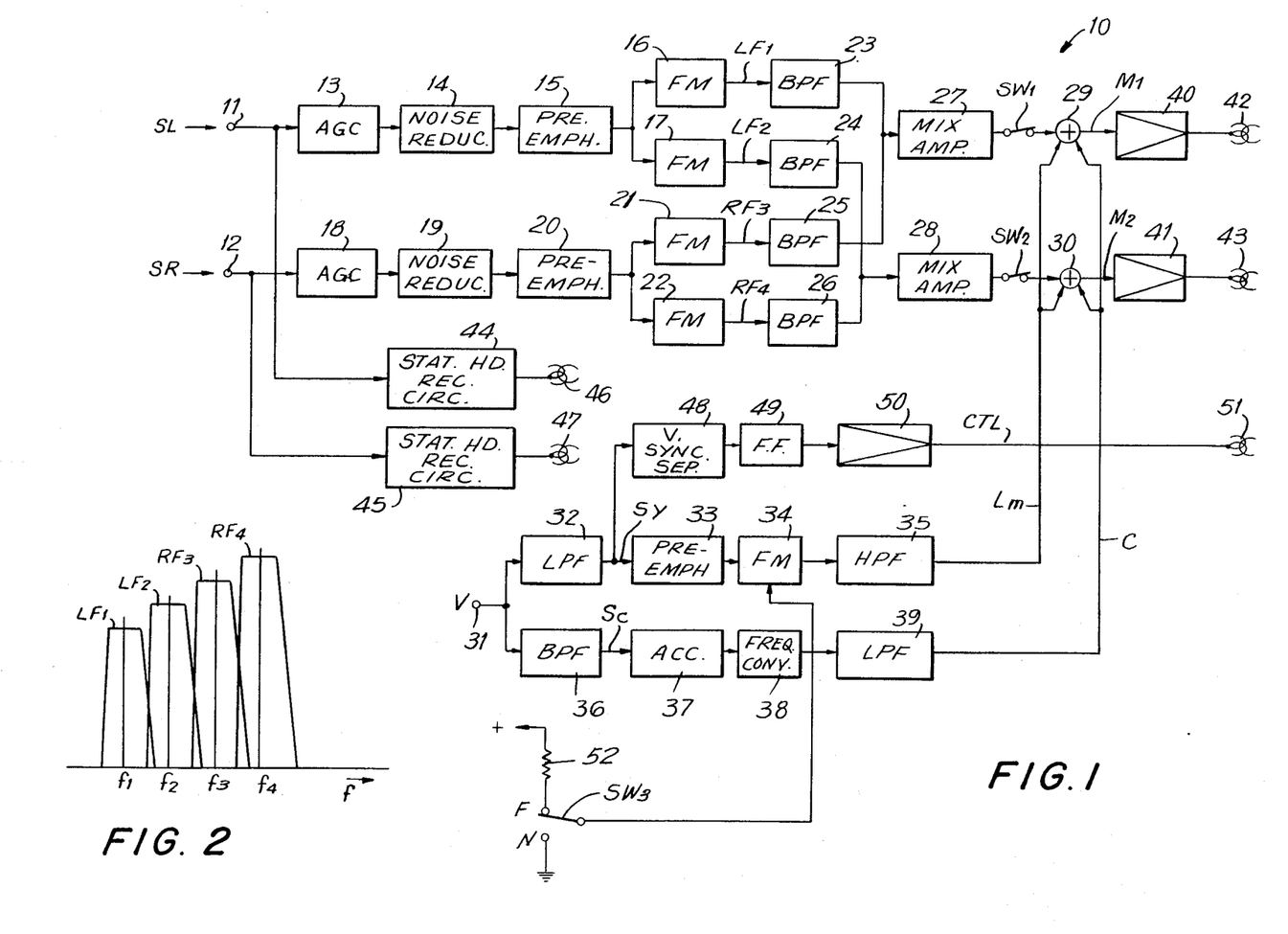
FIG. 1 is a schematic block diagram illustrating a video and audio signal recording apparatus according to an embodiment of this invention.
FIG. 2 is a diagram showing the frequency spectrum of frequency-modulated audio signals and to which reference will be made in explaining operation of the apparatus of FIG. 1.

Referring to the drawings in detail, and initially to FIG. 1 thereof, it will be seen that a video and audio signal recording apparatus 10 according to an embodiment of this invention has audio signal input terminals 11 and 12 to which there are supplied first and second audio signals, for example, a left channel signal SL and a right channel signal SR of a stereophonic audio signal. The left channel signal SL is supplied from terminal 11 through an automatic gain control amplifying circuit 13, a noise reduction circuit 14, and a pre-emphasis circuit 15, in succession, to first and second frequency modulators (FM modulators) 16 and 17. Similarly, the right channel signal SR is supplied from terminal 12 through an automatic gain control amplifying circuit 18, a noise reduction circuit 19 and a pre-emphasis circuit 20, in succession, to third and fourth frequency modulators (FM modulators) 21 and 22.

The first frequency modulator 16 frequency modulates a carrier having a frequency $f_1$, for example, of 1.325 MHz, by the left channel signal SL so as to provide a frequency shift or deviation of the carrier of about 100 to 150 KHz, and to provide at the output of FM modulator 16 a frequency modulated left channel signal or first FM audio signal $LF_1$. The second frequency modulator 17 similarly frequency-modulates, by means of the left channel signal SL, a carrier having a frequency $f_2$, for example, of 1.475 MHz, which is higher than the frequency $f_1$ so as to provide at the output of frequency modulator 7 another frequency modulated left channel signal, hereinafter referred to as a second FM audio signal $LF_2$ having the same frequency shift width or deviation as the first FM audio signal $LF_1$, that is, a frequency deviation of about 100 to 150 KHz, but around a different central frequency. The third and fourth frequency modulators 21 and 22 employ the right channel signal $S_R$ to frequency-modulate a carrier having a frequency $f_3$, for example, of 1.625 MHz, higher than the frequency $f_2$, and a carrier having a frequency $f_4$, for example, of 1.775 MHz, higher than the frequency $f_3$. The frequency modulators 21 and 22 also provide a frequency shift width or deviation of the respective carriers of about 100 to 150 KHz in response to the modulating right channel signal SR, and provide, at their respective outputs, frequency modulated right channel signals $RF_3$ and $RF_4$, hereinafter referred to as third and fourth FM audio signals, which have frequency shift or deviation bands different from each other and also different from the frequency shift or deviation bands of the first and second FM audio signals $LF_1$ and $LF_2$, respectively, as shown on FIG. 2.

In the foregoing example of the invention, the central frequencies $f_1$, $f_2$, $f_3$ and $f_4$ of the carriers are selected so that the differences between adjacent carrier frequencies, that is, 150 KHz, will cause the beat noise component between the left FM signals $LF_1$ and $LF_2$ and the right FM signals $RF_3$ and $RF_4$, after being demodulated, to be outside the reproduced audio signal band.

The first and second or left FM audio signals $LF_1$ and $LF_2$ and the third and fourth or right FM audio signals $RF_3$ and $RF_4$ are passed from modulators 16, 17, 21 and 22 through corresponding band-pass filters 23, 24, 25 and 26, respectively. The levels of the FM audio signals $LF_1$, $LF_2$, $RF_3$ and $RF_4$ are suitably adjusted so as to have successively increased values, that is, so that $LF_1 < LF_2 < RF_3 < RF_4$, as shown on FIG. 2, in which the abscissa represents the frequency f and the ordinate represents the levels of the frequency modulated audio signals. It will be apparent that these signals $LF_1$, $LF_2$, $RF_3$ and $RF_4$ are sequentially arranged with the same difference or interval between their respective central frequencies, and with the respective frequency shift bands or deviation ranges of the adjacent FM audio signals being very close to each other, or even slightly overlapping, so that the entire frequency band encompassing the FM audio signals $LF_1$, $LF_2$, $RF_3$ and $RF_4$ is relatively narrow.

The left FM signal $LF_1$, that is, the first FM audio signal, from band pass filter 23 and the right FM signal $RF_3$, that is, the third FM audio signal from band pass filter 25 are supplied to a mixing amplifier 27, while the left FM signal $LF_2$ or second FM audio signal from band pass filter 24 and the right FM signal $RF_4$ or fourth FM audio signal from band pass filter 26 are supplied to a mixing amplifier 28. The mixed output of mixing amplifier 27, that is, the first FM audio signal $LF_1$ combined with the third FM audio signal $RF_3$, is applied to an adder or mixer 29 to be mixed in the latter with a composite video signal composed of a frequency-modulated luminance signal $L_m$ and a chrominance signal C, so as to provide therefrom a first mixed audio and video signal $M_1$ at an output of mixer 29. Similarly, the output of mixing amplifier 28, that is, the second FM audio signal $LF_2$ combined with the fourth FM audio signal $RF_4$ is supplied to an adder or mixer 30 so as to be mixed or combined in the latter with the frequency-modulated luminance signal $L_m$ and the chrominance signal C constituting the composite color video signal for providing, at the output of mixer 30, a second mixed audio and video signal $M_2$.

The frequency-modulated luminance signal $L_m$ and the chrominance signal C may be provided by a simplified video signal processing circuit shown on FIG. 1 to comprise an input terminal 31 which receives a color video signal V containing both luminance and chrominance components. A low pass filter 32 receives the color video signal V from terminal 31 and separates therefrom the luminance component $S_y$ which is passed through a pre-emphasis circuit 33 to a frequency modulator 34 in which a carrier with a selected central frequency is frequency modulated by the luminance component to provide the frequency modulated luminance component $L_m$ passed through a high pass filter 35 to each of the adders 29 and 30. The color video signal V applied to terminal 31 is also supplied from the latter to a band pass filter 36 which separates the chrominance component $S_c$ from the color video signal and passes the chrominance component through an automatic color control circuit 37 to a frequency converter 38 in which the chrominance component is converted to a frequency band lower than that of the frequency modulated signal $L_m$ supplied to adders 29 and 30. The resulting frequency-converted chrominance component C is supplied through a low pass filter 39 to additional inputs of adders 29 and 30 so as to be combined, in the latter, with the frequency modulated luminance component $l_m$ and with the outputs of mixing amplifiers 27 and 28 for providing the mixed audio and video signals $M_1$ and $M_2$, respectively. Such mixed signals $M_1$ and $M_2$ are supplied through recording amplifier 40 and 41 to magnetic heads 42 and 43, respectively, which preferably have different azimuth angles and which, in a recording mode of apparatus 10, are operative to record the mixed signals $M_1$ and $M_2$ in parallel adjacent record tracks on a magnetic record medium.

Figures 6, 8A, 8B:
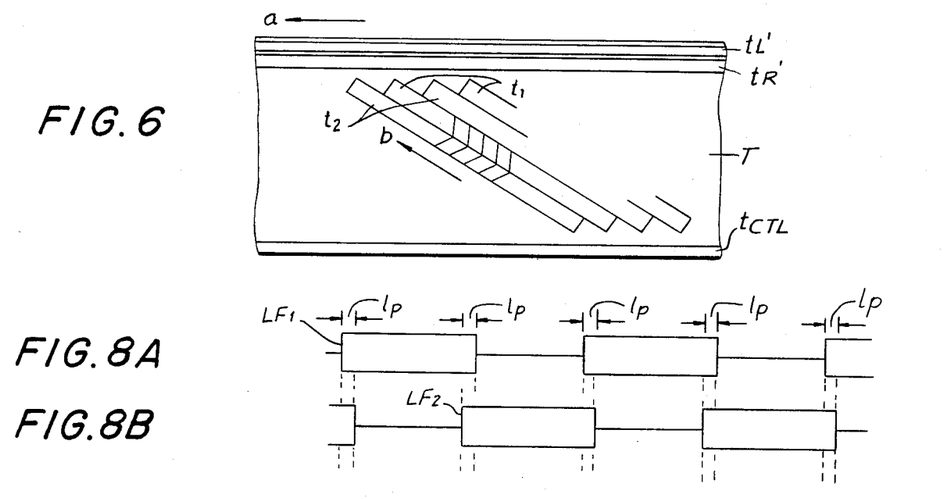
FIG. 6 is a diagrammatic view of a section of magnetic tape, and illustrating record tracks thereon in which video and audio signals are recorded in accordance with this invention.
FIGS. 8A–8F are waveform diagrams to which reference will be made in explaining the operation of the apparatus of FIG. 7.

When the invention is desirably applied to a helical scan video tape recorder (VTR), the magnetic record medium is in the form of a magnetic tape which is suitably guided in a helical path about a substantial portion of the periphery of a guide drum (not shown), and the magnetic heads 42 and 43 are diametrically opposed and rotatably mounted in association with the guide drum for movement in a circular path coinciding with the drum periphery. In that case, during operation of apparatus 10 in the recording mode, heads 42 and 43 are rotated to alternately move obliquely across magnetic tape T, as indicated by the arrow b on FIG. 6, while the tape T is suitably driven in the longitudinal direction indicated by the arrow a, whereby head 42 scans alternating slant or oblique tracks indicated at $t_1$ while head 43 scans the remaining alternating tracks indicated at $t_2$. Thus, if one considers any of the next adjacent parallel slant tracks on tape T, such tracks $t_1$ and $t_2$ are respectively scanned by the heads 42 and 43. Usually, but not necessarily, each of tracks $t_1$ and $t_2$ has recorded therein the video signal information corresponding to a respective field interval of the video signal. Since the heads 42 and 43 have air gaps arranged at substantially different azimuth angles in respect to the plane of rotation of heads 42 and 43, each of the heads, when recording the respective mixed audio and video signal $M_1$ or $M_2$ in the respective tracks on tape T, effects magnetization of magnetic domains in the magnetic coating of the tape in what would appear to be, if such domains were visible, a series of parallel lines or stripes extending across the respective track and each having an orientation that corresponds to the azimuth angle of the respective head. Furthermore, during recording, the speed of advancement of tape T in the direction a is preferably selected so that there will be no guard bands or unrecorded areas between the adjacent tracks $t_1$ and $t_2$ for increasing the recording density of the color video signal on the tape.

In reproducing the mixed signals $M_1$ and $M_2$ recorded in the adjacent tracks $t_1$ and $t_2$ by means of magnetic heads 42 and 43, respectively, or by other reproducing or playback heads having corresponding azimuth angles and alternately scanning the tracks $t_1$ and $t_2$, as each head scans the respective track, the well-known azimuth loss results in attenuation of the signals reproduced by that head from the adjacent tracks. Since such azimuth loss is generally proportional to the frequency of the signal, azimuth loss is relatively ineffective to decrease or eliminate interference due to cross-talk from the low frequency or frequency-converted chrominance component of the recorded composite color video signal. Thus, although the apparatus 10 of FIG. 1 is shown, for the sake of simplicity, to merely frequency-convert the chrominance component of the incoming color video signal V for providing a relatively low frequency band for the chrominance component C of the composite color video signal included in mixed signals $M_1$ and $M_2$, the present invention may also be desirably applied to a recording apparatus of the type disclosed in the previously mentioned U.S. Pat. No. 4,007,482, or in U.S. Pat. No. 4,007,484, also issued Feb. 8, 1977 and having a common assignee herewith, and in which interference or cross-talk between low frequency signals recorded in adjacent tracks is reduced or eliminated by recording the chrominance component with different first and second carriers in the adjacent tracks $t_1$ and $t_2$. Such first and second carriers modulated by the chrominance component $S_c$ for recording in adjacent tracks, respectively, may be distinguished from each other by their respective frequency and/or polarity characteristics so that, upon reproduction of the signal recorded in a particular track $t_1$ or $t_2$, the low frequency band of the cross talk from the tracks $t_2$ or $t_1$, respectively, adjacent thereto can be conveniently suppressed or eliminated by reason of the different frequency and/or polarity or phase characteristics of the respective carriers.

Referring again to FIG. 1, it will be seen that apparatus 10 preferably further includes stationary head recording circuits 44 and 45 through which left channel signal SL and right channel signal SR are supplied from input terminals 11 and 12 to fixed magnetic heads 46 and 47, respectively, disposed adjacent tape T and being operative, in the recording mode of apparatus 10, to record the left channel signal SL and the right channel signal SR in respective longitudinal tracks $t_L$, and $t_R$, extending along a longitudinal edge of tape T (FIG. 6), as in a conventional VTR.

In order to permit the alternating slant or oblique record tracks $t_1$ and $t_2$ to be distinguished from each other when reproducing the signals recorded therein, recording apparatus 10 is further shown to include a vertical sync separator 48 which separates the vertical synchronizing signals from the luminance component $S_Y$ passing through low pass filter 32. The separated vertical synchronizing signals are applied to a flip-flop 49 which provides control signals CTL occurring in correspondence with the recording of color video signals in alternating or every other one of the tracks $t_1$ and $t_2$. The control signals from flip-flop 49 are applied through an amplifier 50 to a fixed head 51 which is disposed adjacent the longitudinal edge portion of tape T remote from the conventional audio tracks $t_L$ and $t_R$. Thus, as tape T is longitudinally advanced during a recording operation of apparatus 10, head 51 records the control signals CTL in the longitudinal track $t_{CTL}$ appearing on FIG. 6 for identifying the slant tracks $t_1$ and $t_2$ in which signals are recorded by the rotary heads 42 and 43, respectively.

Figure 3A:
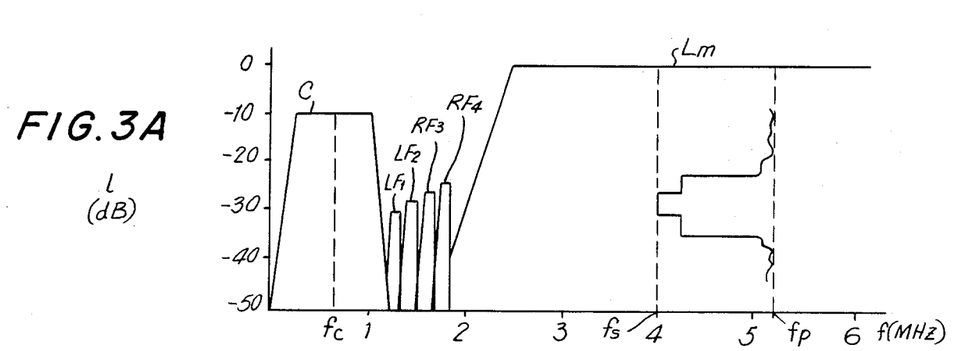
FIGS. 3A and 3B are diagrams respectively showing the frequency spectrum of the frequency-modulated audio signals of FIG. 2 together with the chrominance and luminance components of a video signal, and the frequency spectrum of the video signal alone, and to which reference will also be made in explaining various operations of the apparatus of FIG. 1.

Referring now to FIG. 3A, it will be seen that the frequency $f_c$ of the color sub-carrier of the frequency-converted chrominance signal C has a sufficiently low value, for example, 688 kHz, so that the resulting low frequency band of chrominance signal C will be below the band of the first FM audio signal $LF_1$ having the previously mentioned central frequency $f_1$ of 1.325 MHz. Further, when frequency-converted chrominance signal C and frequency-modulated luminance signal $L_m$ constituting a composite color video signal are to be recorded along with FM audio signals $LF_1$ and $RF_3$ in slant tracks $t_1$, and along with FM audio signals $LF_2$ and $RF_4$ in slant tracks $t_2$, respectively, the central frequency of the carrier to be modulated by the luminance component $S_Y$ in frequency modulator 34 is selected, for example at 4.6 MHz, and the modulation degree is selected so that, in the resulting frequency-modulated luminance signal $L_m$, the sync signal of the luminance component corresponds to a frequency $f_s$, for example, of 4.0 MHz, which is substantially higher than the central frequency $f_4$ of FM audio signal $RF_4$, while the white peak or maximum amplitude of the luminance component corresponds to a frequency $f_p$, for example, of 5.2 MHz, which is higher than the frequency $f_s$ by a predetermined amount, that is, by 1.2 MHz in the example given. It will be appreciated from FIG. 3A, that, with such exemplary values given for the color sub-carrier frequency $f_c$ of the frequency-converted chrominance signal C, and for the frequencies $f_s$ and $f_p$ of the frequency-modulated luminance signal $L_m$, the resulting composite color video signal to be recorded in tracks $t_1$ and $t_2$ has a gap or space in its spectrum between the frequency-converted chrominance signal C and the frequency-modulated luminance signal $L_m$ for accommodating the FM audio signals $LF_1$, $LF_2$, $RF_3$ and $RF_4$.

Further, as shown on FIG. 3A, the level of the frequency-converted chrominance signal C is selected to be larger than the levels of all of the FM audio signals $LF_1$, $LF_2$, $RF_3$ and $RF_4$, and the level of the frequency-modulated luminance signal $L_m$ is selected to be larger than the level of chrominance signal C. It will be appreciated that the sequentially arranged left FM signals $LF_1$ and $LF_2$ and right FM signals $RF_3$ and $RF_4$ are located close to one another in the space or gap between the bands of the frequency-converted chrominance signal C and the frequency-modulated luminance signal $L_m$ so as to minimize, as much as possible, the gap that needs to be provided between the signals C and $L_m$ of the composite video signal and suppression of the latter required for accommodating the FM audio signals $LF_1$, $LF_2$, $RF_3$ and $RF_4$.

Figure 4:
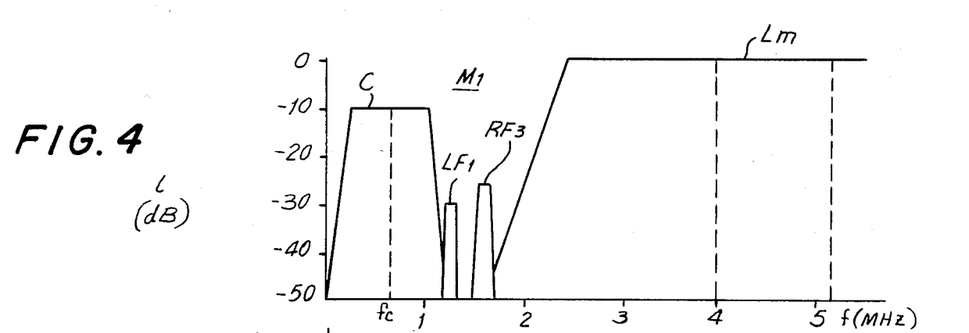
FIGS. 4 and 5 are diagrams showing the frequency spectra of mixed signals which are recorded in parallel adjacent tracks, respectively, by the apparatus of FIG. 1.

As earlier noted, the first mixed signal $M_1$, in which frequency-converted chrominance signal C and frequency-modulated luminance signal $L_m$ are mixed with left FM signal $LF_1$ and right FM signal $RF_3$, is supplied from adder 29 through amplifier 40 to rotary magnetic head 42. The second mixed signal $M_2$, in which the frequency-converted chrominance signal C and the frequency-modulated luminance signal $L_m$ are mixed with the left FM signal $LF_2$ and the right FM signal $RF_4$, is supplied from adder 30 through amplifier 41 to rotary magnetic head 43. These rotary magnetic heads 42 and 43, which have different azimuth angles, alternately form or scan the oblique or slant tracks $t_1$ and $t_2$, respectively, with no guard bands therebetween, whereby the first and second mixed signals $M_1$ and $M_2$ are alternately recorded in such tracks $t_1$ and $t_2$. The first and second mixed signals $M_1$ and $M_2$ alternately recorded in tracks $t_1$ and $t_2$ have the frequency spectra shown in FIGS. 4 and 5, respectively. It will be appreciated therefrom that, in the illustrated embodiment of this invention, the FM audio signals recorded in each track $t_1$, that is, the left FM signal $LF_1$ and the right FM signal RF do not have adjacent frequency bands. Similarly, the FM audio signals recorded in each track $t_2$, that is, the left FM signal $LF_2$ and the right FM signal RF do not have adjacent frequency bands. Further, it will be appreciated that the FM audio signals $LF_1$ and $RF_3$ are recorded in each track $t_1$ by the rotary head 42 with an azimuth angle different from that with which the head 43 records the FM audio signals $LF_2$ and $RF_4$ in each adjacent track $t_2$. Furthermore, the carrier frequencies $f_1$ and $f_3$ and the carrier frequencies $f_2$ and $f_4$ of the FM audio signals recorded in the adjacent slant tracks $t_1$ and $t_2$, respectively, are not coincident with each other.

At the same time that the FM audio signals contained in mixed signals $M_1$ and $M_2$ are being recorded along with the composite color video signal in slant tracks $t_1$ and $t_2$ by means of rotary heads 42 and 43, apparatus 10 may also record the left and right channel signals SL and SR in longitudinal tracks $t_{L'}$ and $t_{R'}$ by means of fixed heads 46 and 47 so that the tape T thus recorded can be played back or is compatible with a conventional VTR in which only fixed heads are provided for reproducing the recorded audio signals.

In respect to the FM audio signals recorded with the frequency-converted chrominance signal C and the frequency-modulated luminance signal $L_m$ by the rotary magnetic heads 42 and 43 in the slant tracks $t_1$ and $t_2$, it will be appreciated that, since the relative speed of rotary heads 42 and 43 in respect to magnetic tape T is selected to be sufficiently high for recording the video signal, such high relative speed ensures high quality recording of the audio signals, such as the stereophonic left channel signal and right channel signal, while using a narrow frequency band for the corresponding FM audio signals $LF_1$, $LF_2$, $RF_3$ and $RF_4$ for preventing suppression of the frequency band of the composite color video signal.

Figure 3B:
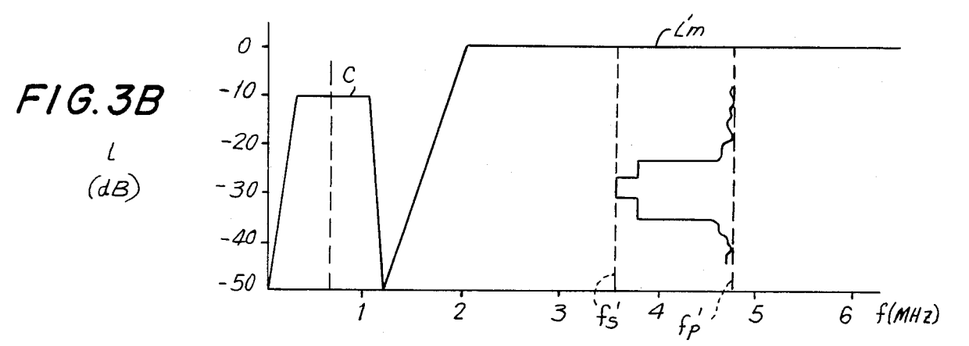

However, if it is desired to record the audio signals only in the longitudinal tracks $t_{L'}$ and $t_{R'}$ by means of the fixed heads 46 and 47, for example, when it is known that the tape being recorded will only be played back in a conventional VTR which is capable only of reproducing audio signals recorded in such longitudinal tracks, then normally closed switches $SW_1$ and $SW_2$ interposed between mixing amplifier 27 and adder 29 and between mixing amplifier 28 and adder 30, respectively, may be opened. In that case, the supplying of FM audio signals $LF_1$ and $RF_3$ to rotary head 42 and the supplying of FM audio signals $LF_2$ and $RF_4$ to rotary head 43 are discontinued, and such rotary heads 42 and 43 will only record successive fields of the composite color video signal ($L_m$+C) in the adjacent slant tracks $t_1$ and $t_2$. Since only the composite color video signal is being recorded by rotary heads 42 and 43 in slant tracks $t_1$ and $t_2$, there is no need to maintain a gap between the frequency band of frequency-converted chrominance signal C and the frequency band of frequency-modulated luminance signal $L_m$. Therefore, as shown on FIG. 1, recording apparatus 10 is desirably provided with a switch $SW_3$ having a fixed contact F connected through a resistor 52 to a voltage source, and another fixed contact M connected to ground. The movable contact of switch $SW_3$ is connected to frequency modulator 34 so that, when switch $SW_3$ is in the condition illustrated on FIG. 1, a suitable control voltage is applied therethrough to frequency modulator 34 for establishing the desired central frequency, for example, of 4.6 MHz, which results in the gap or space between the band of frequency-converted chrominance signal C and the band of frequency-modulated luminance signal $L_m$ on FIG. 3A. However, when switch $SW_3$ is changed over to engage its contact N connected to ground, the corresponding value of the control signal applied to frequency modulator 34 shifts the central frequency of the carrier modulated therein, for example, to a value of 4.2 MHz, with the result that the gap between the frequency-converted chrominance signal C and the frequency-modulated luminance signal $L'_m$ is substantially closed and the synchronizing signal and white peak levels $f'_f$ and $f'_p$, respectively, have values of approximately 3.6 and 4.8 MHz. Thus, when FM audio signals are not being recorded along with the composite color video signal in the slant tracks $t_1$ and $t_2$, the full frequency band is available for the video signal, as shown on FIG. 3B.

Figure 5:
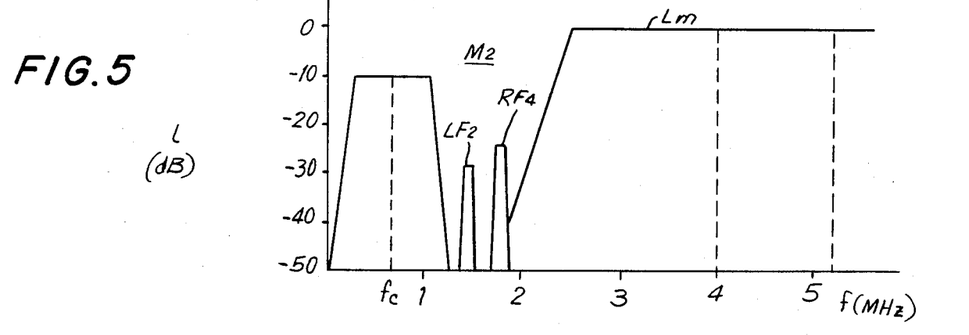

On the other hand, when the composite color video signal and the FM audio signals are recorded together in the slant tracks $t_1$ and $t_2$ in accordance with the present invention, the corresponding audio signals, for example, the left and right channel signals can be reproduced with good separation from each other and with minimized interference due to cross talk from adjacent tracks. The manner in which such advantageous reproduction is effected will be described with reference to FIG. 7 in which a reproducing apparatus 10' or a reproducing section of a recording and reproducing apparatus is shown to include rotary magnetic heads 42' and 43' corresponding to the heads 42 and 43, respectively, of the recording section or apparatus 10, and being operative to alternately scan the slant tracks $t_1$ and $t_2$ formed on magnetic tape T by such recording apparatus or section. The movements of rotary heads 42' and 43' are suitably controlled, for example, by a known servo system (not shown), so that, during one field, head 42' scans a slant track $t_1$ and, during the next field, the other rotary magnetic head 43' scans the adjacent slant track $t_2$. Since the head 42' has an azimuth angle corresponding to that of the head 42 with which mixed signal $M_1$ was recorded in slant track $t_1$, and head 43' has an azimuth angle corresponding to that of the magnetic head 43 with which mixed audio and video signal $M_2$ was recorded in slant track $t_2$, magnetic head 42' mainly reproduces the first mixed signal $M_1$ from the scanned track $t_1$ with the frequency spectrum shown in FIG. 4, and the second mixed signal $M_2$ having the frequency spectrum shown in FIG. 5 is mixed therewith only as a cross talk component from the adjacent tracks $t_2$. On the other hand, magnetic head 43 mainly reproduces the second mixed signal $M_2$ from the track $t_2$ being scanned and having the frequency spectrum of FIG. 5, while the first mixed signal $M_1$ is mixed therewith only as the cross talk component from the adjacent tracks $t_1$. The outputs from heads 42' and 43' are respectively supplied through reproducing amplifiers 53 and 54 to a video signal processing circuit 55 which, in correspondence to the simplified video signal processing circuit in the recording apparatus 10 of FIG. 1, is effective to separate the frequency-converted chrominance signal C and the frequency-modulated luminance signal $L_m$ from each of the mixed signal $M_1$ and $M_2$ and then to reconvert the chrominance signal to its original frequency band and to demodulate the frequency-modulated luminance signal.

Figure 7:
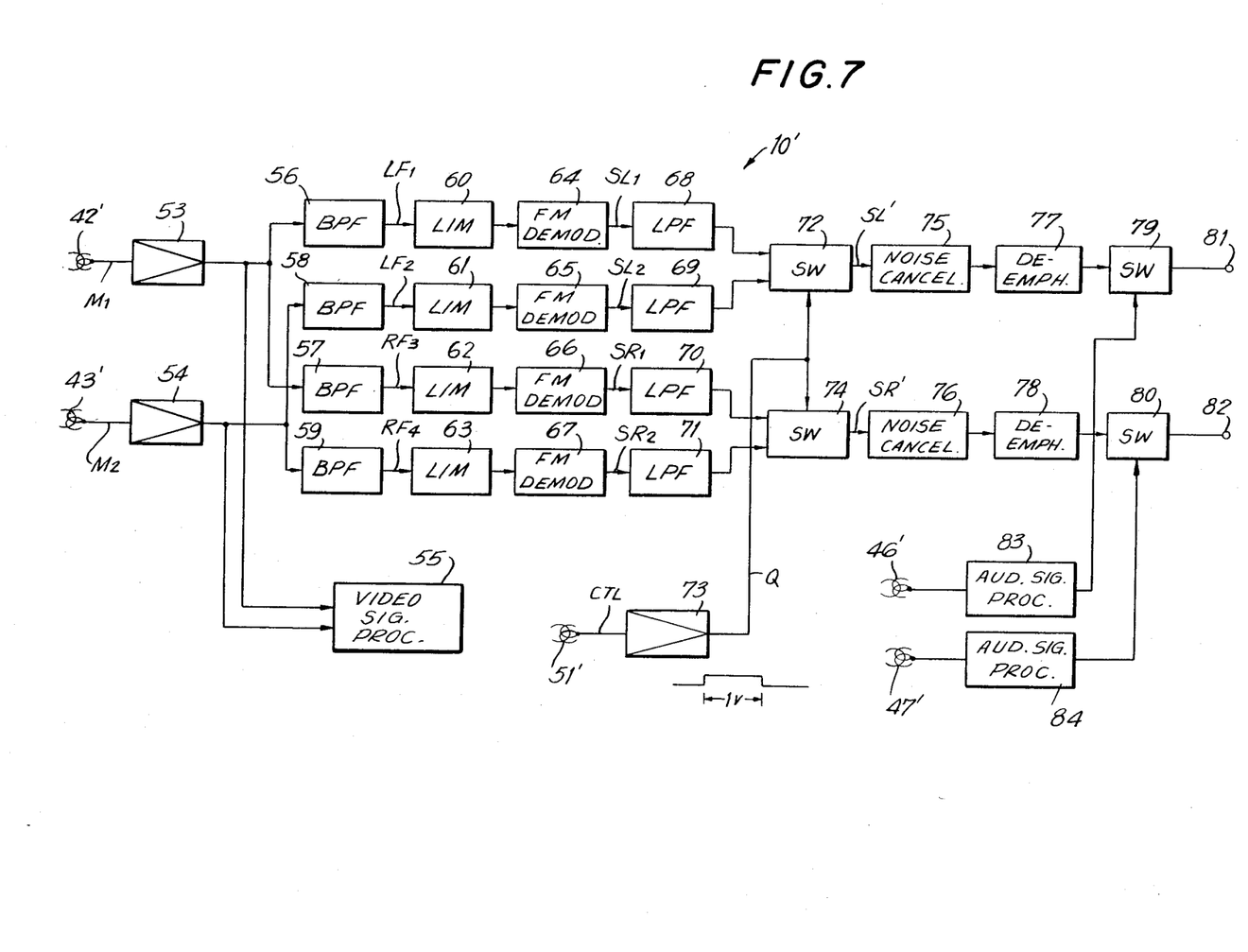
FIG. 7 is a block diagram showing apparatus for reproducing video and audio signals recorded by the apparatus of FIG. 1.

Of course, if the chrominance signal has been recorded with different first and second carriers in the adjacent tracks $t_1$ and $t_2$, for example, as mentioned above with reference to U.S. Pat. Nos. 4,007,482 and 4,007,484, then the video signal processing circuit 55 of reproducing circuit 10' may be arranged as shown in either of those patents for suppressing or eliminating the low frequency band of cross talk between tracks $t_1$ and $t_2$ by reason of the different frequency and/or polarity or phase characteristics of the respective carriers.

The output of head 42', as obtained from reproducing amplifier 53, is also supplied to band pass filters 56 and 57 which respectively pass therethrough the left FM signal $LF_1$ (FIG. 8A) and the right FM signal $RF_3$. Although such left FM signal $LF_1$ and right FM signal $RF_3$ in the output from head 42' are reproduced from the same slant track $t_1$, the frequency bands of such signals $LF_1$ and $RF_3$ are spaced from each other, that is, are not immediately adjacent, as is apparent from FIG. 4, so that such FM audio signals $LF_1$ and $RF_3$ can be satisfactorily separated from each other by band pass filters 56 and 57. Thus, band pass filters 56 and 57 deliver the left FM signal $LF_1$ and the right FM signal $RF_3$, respectively, without mixing therewith any substantial cross talk component of the other. Similarly, the output of head 43', as obtained from reproducing amplifier 54, is supplied to band pass filters 58 and 59 which respectively permit the left FM signal $LF_2$ (FIG. 8B) and the right FM signal $RF_4$ to pass therethrough. Although such FM audio signals $LF_2$ and $RF_4$ in the output from head 43' are also reproduced from the same slant track $t_2$, their frequency bands are also spaced from each other, as shown on FIG. 5, and such signals can be effectively separated from each other by band pass filters 58 and 59. Thus, band pass filters 58 and 59 provide, at their outputs, the left FM signal $LF_2$ and the right FM signal $RF_4$, respectively, with each such signal being essentially free of any cross talk component from the other.

Figures 8C, 8D:
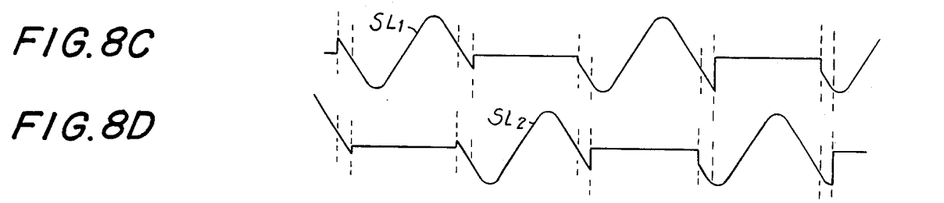

The left FM signals $LF_1$ and $LF_2$ and the right FM signals $RF_3$ and $RF_4$ obtained from band pass filters 56 and 58 and band pass filters 57 and 59, respectively, are supplied through amplitude limiters 60, 61, 62 and 63, respectively, to corresponding FM demodulators 64, 65, 66 and 67. It will be appreciated that, during the reproduction of the fields of the video signal recorded in slant tracks $t_1$, portions of the demodulated, reproduced left and right channel signals $SL_1$ (FIG. 8C) and $SR_1$, respectively, appear at the outputs of demodulators 64 and 66, respectively. On the other hand, during the reproduction of fields of the video signal recorded in tracks $t_2$, portions of the demodulated reproduced left and right channel signals $SL_2$ (FIG. 8D) and $SR_2$, respectively, appear at the outputs of frequency demodulators 65 and 67. Such outputs of frequency demodulators 64, 65, 66 and 67 are passed through low pass filters 68, 69, 70 and 71, respectively, which are each designed to pass the audio signal band. The purpose of the low pass filters 68-71 is to remove from the audio signals supplied thereto any beat noises that may occur in the outputs of frequency demodulators 64-67 due to the existence of cross talk components in the signals reproduced by heads 42' and 43'.

More particularly, each of the left FM signals $LF_1$ and $LF_2$ and the right FM signals $RF_3$ and $RF_4$ derived from band pass filters 56-59, respectively, may contain cross talk components of an FM audio signal reproduced from the adjacent slant tracks and having a frequency band which is close to that of the main FM audio signal being passed through the respective one of filters 56-59. In other words, the left FM signal $LF_1$ passed through band pass filter 56, as a main signal, may also contain, as a cross talk component, the left FM signal $LF_2$; the left FM signal $LF_2$ passed through band pass filter 58, as a main signal, may also contain, as cross talk components, the left FM signal $LF_1$ and the right FM signal $RF_3$; the right FM signal $RF_3$ passed, as a main signal, through band pass filter 57 may also contain, as cross talk components, the left FM signal $LF_2$ and the right FM signal $RF_4$; and the right FM signal $RF_4$ passed, as a main signal, through band pass filter 59 may also contain, as a cross talk component, the right FM signal $RF_3$. However, since such cross talk components from the adjacent tracks have the levels thereof reduced by the reproduction azimuth losses, and further since the cross talk components supplied, along with the respective main signals, to the band pass filters 56-59 have frequency bands which are not coincident with the frequency pass bands of the respective band pass filters, the levels of the cross talk components, as applied to frequency demodulators 64-67, are quite low for reducing the influences of such cross talk components. However, even such low level cross talk components, when mixed in the signals applied to the inputs of frequency demodulators 64-67, cause beating to occur between the main channel signals and the cross talk components and, accordingly, beat noises are produced in the outputs from frequency demodulators 64-67. However, in the previously described recording apparatus 10 according to this invention, the carrier frequencies $f_1$, $f_2$, $f_3$ and $f_4$ of the FM audio signals $LF_1$, $LF_2$, $RF_3$ and $RF_4$, respectively, have been selected so that the difference between the adjacent carrier frequencies, for example, 150 kHz, and hence the frequency of the described beat noise, will be outside the reproduced audio signal band passed by low pass filters 68-71. Thus, any beat noises appearing at the outputs of frequency demodulators 64-67 are removed by filters 68-71, respectively.

In view of the above, portions of the reproduced left channel signal SL, without any components of the right channel signal SR or any beat noise mixed therewith, are provided at the outputs of low pass filters 68 and 69 in alternating fields of the video signal. Similarly, portions of the reproduced right channel signal SR, without any components of the left channel signal SL or any beat noise mixed therewith, are provided at the outputs of low pass filters 70 and 71 during alternating fields of the reproduced video signal.

Figures 8E, 8F:
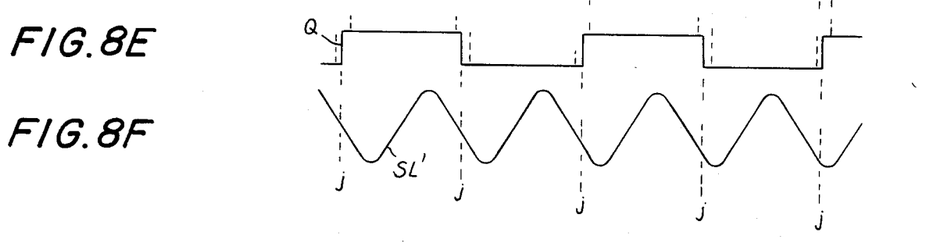

The portions $SL_1$ and $SL_2$ of the reproduced left channel signal obtained from low pass filters 68 and 69, as described above, are alternately passed through a switch circuit 72 which is changed over at each video field period in response to the control signal CTL reproduced by a fixed head 51' from the track $t_{CTL}$ on tape T and being supplied through an amplifier 73 as a switch control signal Q (FIG. 8E) applied to switch circuit 72. Thus, a continuous reproduced left channel signal SL' (FIG. 8F) is obtained from the output of switch circuit 72. Similarly, the portions of the right channel signal SR obtained from low pass filters 70 and 71 in alternating fields of the video signal are alternately passed through a switch circuit 74 under the control of the switch control signal Q from amplifier 73 so that a continuous reproduced right channel signal SR is obtained at the output of switch circuit 74. Such continuous or successive reproduced left and right channel signals SL' and SR' obtained from the outputs of switch circuits 72 and 74 are passed through noise cancelling circuits 75 and 76, respectively, for cancelling or removing noises from the respective signals caused by dropouts in the outputs from magnetic heads 42' and 43', and then through de-emphasis circuits 77 and 78, respectively, which are complementary to the pre-emphasis circuits 15 and 20 in recording apparatus 10 and include low pass filters (not shown). The resulting left and right channel audio output signals are applied through switching circuits 79 and 80, respectively, to audio output terminals 81 and 82. The switching circuits 79 and 80 are provided for selectively supplying to the respective audio output terminals 81 and 82 either the reproduced continuous or successive left and right channel signals SL and SR, as reproduced from the slant tracks $t_1$ and $t_2$ by rotary heads 42' and 43', as described above, or the left and right channel signals reproduced by fixed heads 46' and 47' (FIG. 7) from the conventional longitudinal audio tracks $t_{L'}$ and $t_{R'}$ on the tape and which are supplied to switching circuits 79 and 80 through conventional audio signal processing circuits 83 and 84, respectively.

Figures 9A, 9B:
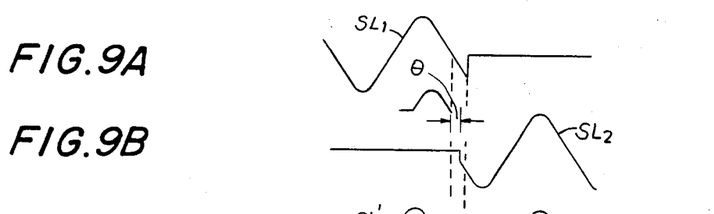
FIGS. 9A–9D are waveform diagrams to which reference will be made in explaining how the apparatus of FIG. 7 substantially removes so-called junction errors in the reproduced audio signals.
Figures 9C, 9D:
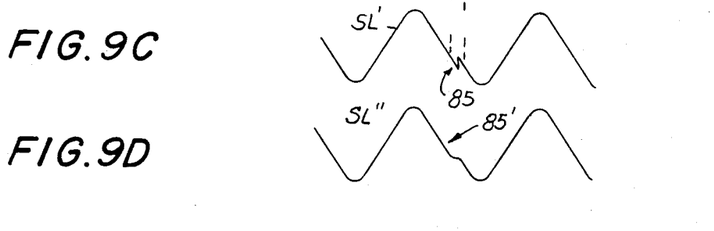

It will be seen that, in the reproducing apparatus or section 10' according to this invention, the switch circuits 72 and 74 are located after the frequency demodulators 64 and 65 and the frequency demodulators 66 and 67, respectively. Thus, switch circuits 72 and 74 act to combine or join successive portions $SL_1$ and $SL_2$ (FIGS. 8C and 8D) or $SR_1$ and $SR_2$ of demodulated relatively low frequency signals. Such relatively low frequency or audio signals can be combined relatively easily without large junction errors, as on FIG. 8F. However, even if such junction errors do occur, for example, as at 85 on FIG. 9C, due to, for example, an angular deviation from the desired diametrically opposed relation of rotary heads 42' and 43' and a corresponding phase difference $\theta$ between the demodulated signal portions $SL_1$ and $SL_2$, (FIGS. 9A and 9B), each such junction error 85 involves an abrupt or high frequency change in the combined signal SL' and thus is substantially eliminated by the previously mentioned low pass filter conventionally included in the de-emphasis circuit 77 or 78. Accordingly, as shown in FIG. 9D, even if there is a junction error in the combined signal SL' issuing from switch circuit 72, the corresponding combined signal SL" derived from de-emphasis circuit 77 will be substantially smoothed at the location of the junction error, as shown at 85'.

It will be appreciated from the foregoing that the recording and reproducing of video and audio signals according to this invention is compatible with the high density recording of the video signal, for example, by using any of the techniques disclosed in U.S. Pat. Nos. 4,007,482 and 4,007,484, and that, by employing the rotary magnetic heads for recording and reproducing the frequency modulated audio signals together with the video signal, the high quality recording and reproducing of the audio signal is ensured. More particularly, the recording and reproducing of the audio signal in a VTR according to this invention overcomes a problem encountered with the audio reproduction or playback in a conventional VTR when the latter is operated in its slow motion or other so-called "trick" mode. In the conventional VTR in which the audio signals are recorded only in the longitudinal tracks $t_{L'}$ and $t_{R'}$ extending along the tape T and are reproduced by fixed heads, the head-to-tape speed is very substantially reduced in the slow-motion playback or reproducing mode with the result that the tones or frequencies of the reproduced audio are drastically altered and the audio becomes substantially unintelligible. On the other hand, in the apparatus according to the present invention, since the FM audio signals are recorded in the slant tracks $t_1$ and $t_2$ along with the video signal and are reproduced by the rotary heads 42' and 43', the reduction in the tape speed for the slow-motion playback mode changes the rate at which recorded words are uttered, but does not substantially change the head-to-tape speed for the rotary heads 42' and 43' so that the frequencies and tones of the reproduced audio are not substantially changed and the relatively slowly uttered words or sounds thereof can still be understood.

It will also be seen that, since the left and right channel audio signals are converted into the narrow band frequency-modulated signals $LF_1$, $LF_2$, $RF_3$ and $RF_4$ for recording, only a relatively narrow frequency band is required for such FM audio signals and the band of the video signal is not significantly suppressed. Further, as previously described, during playback, the left and right channel signals are reproduced with sufficient separation therebetween and with any cross talk interference from adjacent tracks being eliminated or at least considerably reduced.

Furthermore, since the described embodiment of the invention includes fixed heads 46 and 47, and 46' and 47' for recording and reproducing, respectively, the audio signals in the conventional longitudinal tracks $t_{L'}$ and $t_{R'}$ on tape T, any tape on which video and audio signals have been recorded by the apparatus according to this invention can be played back in a conventional video and audio signal reproducing apparatus having fixed audio reproducing heads. Thus, the apparatus according to this invention is compatible with a conventional reproducing apparatus.

Although the arrangement of the FM audio signals described above with reference to FIG. 2 is generally preferred, in a recording apparatus according to this invention, the carriers having the frequencies $f_1$ and $f_3$ may be frequency modulated by the left channel signal SL to provide left FM signals $LF_1$ and $LF_3$, respectively, while the carriers having the frequencies $f_2$ and $f_4$ may be respectively frequency modulated by the right channel signal SR so as to provide right FM signals $RF_2$ and $RF_4$. In such case, the FM audio signals having frequency bands adjacent to each other are recorded in the same slant track on tape T. Thus, for example, left FM signal $LF_1$ and right FM signal $RF_2$ are recorded in each slant track $t_1$, and left FM signal $LF_3$ and right FM signal $RF_4$ are recorded in each slant track $t_2$. The foregoing arrangement has certain advantages and disadvantages. First, in respect to the advantage of the modified arrangement, it will be understood that the video signal processing circuit 55 of the reproducing apparatus or section 10' includes trap circuits for removing the reproduced FM audio signals. When the FM audio signals are arranged as shown on FIG. 2, each trap circuit has to be capable of removing two narrow separated bands, for example, the bands of FM audio signals $LF_1$ and $RF_3$, or the bands of FM audio signals $LF_2$ and $RF_4$, and this is difficult to achieve. On the other hand, in the modified arrangement in which the FM audio signals recorded in each slant track have adjacent frequency bands, the respective trap circuit in video signal processing circuit 55 need only remove a single relatively wide band, for example, a band encompassing the previously mentioned FM audio signal $LF_1$ and $RF_2$ or $LF_3$ and $RF_4$. Although the described alternative recording arrangement in which the FM audio signals $LF_1$ and $RF_2$ are recorded in each track $t_1$ and the FM audio signals $LF_3$ and $RF_4$ are recorded in each slant track $t_2$, is substantially effective in the manner previously described for avoiding interference due to cross talk from adjacent tracks during playback, such alternate arrangement experiences difficulties, due to the closeness of the frequency bands of the FM audio signals recorded in each track $t_1$ or $t_2$, in effecting the separation of the left FM signal $LF_1$ from the right FM signal $RF_2$ and in effecting separation of the left FM signal $LF_3$ from the right FM signal $RF_4$ by the use of respective band pass filters, as at 56–59 on FIG. 7. In order to adequately separate such FM audio signals lying in adjacent frequency bands, it is necessary to increase the interval between the frequencies $f_1$ and $f_2$ and between the frequencies $f_3$ and $f_4$. However, if the foregoing measure is adopted for increasing the effectiveness of the separating filters, the frequency band width occupied by the FM audio signals $LF_1$, $RF_2$, $LF_3$ and $RF_4$ is substantially increased, thereby suppressing the bands of the frequency-converted chrominance signal C and the frequency-modulated luminance signal $L_m$ with resulting deterioration in the quality of the reproduced video or picture.

Finally, although the recording apparatus 10 and the reproducing apparatus 10' are shown separately on FIGS. 1 and 7, it is apparent that the same may constitute recording and reproducing sections of a single apparatus and have at least certain of the magnetic heads in common.

Having specifically described an illustrative embodiment of this invention with reference to the accompanying drawings, it is to be understood that the invention is not limited to that precise embodiment, and that various changes and modifications, among which several have been mentioned, may be effected therein by one skilled in the art without departing from the scope or spirit of the invention as defined in the appended claims.

What is claimed is:

1. A video and audio signal recording apparatus comprising:
   frequency-modulating means for modulating first and second carriers by a first audio signal to be recorded and thereby providing first and second FM audio signals, respectively, and for modulating third and fourth carriers by a second audio signal to be recorded and thereby providing third and fourth FM audio signals, respectively, said first, second, third and fourth carriers having different respective frequencies;
   first mixing means for mixing, with a video signal, two of said FM audio signals which represent said first and second audio signals to be recorded, respectively, and thereby providing a first mixed audio and video signal;
   second mixing means for mixing the other two of said FM audio signals with said video signal and thereby providing a second mixed audio and video signal; and
   first and second magnetic heads having different azimuth angles and respectively receiving said first and second mixed audio and video signals from said first and second mixing means for recording said first and second mixed signals in respective record tracks which are adjacent each other on a magnetic record medium.

2. A video and audio signal recording apparatus according to claim 1; in which said respective frequencies of said first, second, third and fourth carriers have successively increased values, said two FM audio signals mixed with said video signal in said first mixing means are said first and third FM audio signals, and said other two FM audio signals mixed with said video signal in said second mixing means are said second and fourth FM audio signals.

3. A video and audio signal recording apparatus according to claim 2; in which said first and second audio signals to be recorded are stereophonic left and right signals, respectively.

4. A video and audio signal recording apparatus according to claim 1; in which said first and second audio signals to be recorded are stereophonic left and right signals, respectively.

5. A video and audio signal recording apparatus according to claim 1; in which said video signal includes at least a luminance component; and further comprising additional frequency-modulating means for modulating an additional carrier with said luminance component, said additional carrier having a frequency substantially higher than that of all of said first through fourth carriers so that the resulting FM luminance signal is in a band that is, at least for the major part thereof, above a band containing said first through fourth FM audio signals.

6. A video and audio signal recording apparatus according to claim 5; in which said video signal is a color video signal further including a chrominance component; and further comprising frequency converting means for converting said chrominance component to a frequency converted chrominance signal in a relatively low frequency band spaced from said band of said FM luminance signal to provide a gap therebetween in which said first through fourth FM audio signals are situated, and means for applying said FM luminance signal and said frequency converted chrominance signal to each of said first and second mixing means.

7. A video and audio signal recording apparatus according to claim 6; in which said respective frequencies of said first, second, third and fourth carriers have successively increased values, said first and second audio signals to be recorded are stereophonic left and right signals, respectively, said first and third FM audio signals are mixed with said FM luminance signal and said frequency converted chrominance signal in said first mixing means, and said second and fourth FM audio signal are mixed with said FM luminance signal and said frequency converted chrominance signal in said second mixing means.

8. A video and audio signal recording apparatus according to claim 1; in which said record tracks which are adjacent each other on the record medium are parallel and arranged without guard bands therebetween.

9. A video and audio signal recording apparatus according to claim 8; in which said record medium is a magnetic tape, and said first and second heads are driven in a circular path to alternately scan across said tape while the latter is advanced longitudinally so that said first and second mixed signals are recorded in alternating parallel record tracks which are skewed relative to said tape.

10. A video and audio signal recording apparatus according to claim 9; further comprising fixed magnetic heads disposed adjacent said magnetic tape and respectively receiving said first and second audio signals to be recorded in respective longitudinal tracks along the tape.

11. A video and audio signal recording apparatus according to claim 10; further comprising switch means for selectively interrupting the application of said FM audio signals to said first and second mixing means so that said first and second audio signals are then recorded only in said longitudinal tracks along the tape.

12. A video and audio signal recording apparatus according to claim 11; in which said video signal is a color video signal which includes luminance and chrominance components; and further comprising frequency converting means for converting said chrominance component to a frequency converted chrominance signal in a relatively low frequency band, additional frequency modulating means for modulating an additional carrier with said luminance component, and control means for said additional frequency modulating means selectively changing the frequency of said additional carrier so that the resulting FM luminance signal is in a band extending upwardly from said band of the frequency converted chrominance signal when said first and second audio signals are recorded only in said longitudinal tracks and said frequency of the additional carrier is shifted upwardly to provide a gap between said bands of the FM luminance signal and the frequency converted chrominance signal and in which said first through fourth FM audio signals are situated when said FM audio signals are applied to said mixing means for recording said first and second audio signals in said parallel record tracks skewed relative to the tape.

13. In apparatus for recording and reproducing video and audio signals in successive parallel record tracks on a magnetic record medium: the combination of recording circuit means comprising frequency-modulating means for modulating first and second carriers by a first audio signal to be recorded and thereby providing first and second FM audio signals, respectively, and for modulating third and fourth carriers by a second video signal to be recorded and thereby providing third and fourth FM audio signals, respectively, said first, second, third and fourth carriers having different respective frequencies, first mixing means for mixing, with a video signal, two of said FM audio signals which represent said first and second audio signals to be recorded, respectively, and thereby providing a first mixed audio and video signal, and second mixing means for mixing the other two of said FM audio signals with said video signal and thereby providing a second mixed audio and video signal;

first and second magnetic head means having different azimuth angles and respectively scanning adjacent first and second ones of said successive record tracks on the record medium, said first and second head means being operative, in a recording mode of the apparatus, to respectively receive said first and second mixed audio and video signals for recording in said first and second adjacent record tracks, respectively, and said first and second head means being operative, in a reproducing mode of the apparatus, to alternately reproduce the first and second mixed audio and video signals from said first and second adjacent record tracks, respectively; and reproducing circuit means comprising means for separating said two FM audio signals from the reproduced first mixed audio and video signal, means for separating said other two FM audio signals from the reproduced second mixed audio and video signal, frequency-demodulating means receiving the FM audio signals separated from said first and second mixed audio and video signals and demodulating therefrom respective alternately reproduced portions of said first and second audio signals, and combining means for sequentially combining said alternately reproduced portions of the first and second audio signals and thereby providing substantially continuous demodulated first and second audio signals.

14. An apparatus for recording and reproducing video and audio signals according to claim 13; in which said respective different frequencies of said first, second, third and fourth carriers have successively increased values, said two FM audio signals mixed with said video signal in said first mixing means are said first and third FM audio signals, and said other two FM audio signals mixed with said video signal in said second mixing means are said second and fourth FM audio signals.

15. An apparatus for recording and reproducing video and audio signals according to claim 14; in which said first and second audio signals to be recorded are stereophonic left and right signals, respectively.

16. An apparatus for recording and reproducing video and audio signals according to claim 15; in which said frequency-demodulating means includes first, second, third and fourth demodulators respectively receiving said first, second, third and fourth FM audio signals separated from the reproduced first and second mixed audio and video signals; and in which said combining means includes first switch means alternately delivering demodulated audio signals from said first and second demodulators, and second switch means alternately delivering demodulated audio signals from said third and fourth demodulators, each of said switch means being operated in synchronism with the alternate reproduction by said first and second head means of said first and second mixed audio and video signals from said first and second adjacent record tracks, respectively.

17. An apparatus for recording and reproducing video and audio signals according to claim 16; in which said combining means further includes de-emphasis means receiving the output of each of said first and second switch means and including low pass filter means for smoothing transitions between the demodulated audio signals alternately delivered through the respective switch means.

18. An apparatus for recording and reproducing audio and video signals according to claim 13; in which said first and second audio signals to be recorded are stereophonic left and right signals, respectively.

19. An apparatus for recording and reproducing video and audio signals according to claim 13; in which said video signal includes at least a luminance component; and in which said recording circuit means further comprises additional frequency-modulating means for modulating an additional carrier with said luminance component, said additional carrier having a frequency substantially higher than that of all of said first through fourth carriers so that the resulting FM luminance signal is in a band that is, at least for the major part thereof, above a band containing said first through fourth FM audio signals.

20. An apparatus for recording and reproducing video and audio signals according to claim 19; in which said video signal is a color video signal further including a chrominance component; and further comprising frequency converting means for converting said chrominance component to a frequency converted chrominance signal in a relatively low frequency band spaced from said band of said FM luminance signal to provide a gap therebetween in which said first through fourth FM audio signals are situated, and means for applying said FM luminance signal and said frequency converted chrominance signal to each of said first and second mixing means.

21. An apparatus for recording and reproducing video and audio signals according to claim 20; in which said respective frequencies of said first, second, third and fourth carriers have successively increased values, said first and second audio signals to be recorded are stereophonic left and right signals, respectively, said first and third FM audio signals are mixed with said FM luminance signal and said frequency converted chrominance signal in said first mixing means, and said second and fourth FM audio signals are mixed with said FM luminance signal and said frequency converted chrominance signal in said second mixing means.

22. An apparatus for recording and reproducing video and audio signals according to claim 13; in which said record tracks which are adjacent each other on the record medium are parallel and arranged without guard bands therebetween.

23. An apparatus for recording and reproducing video and audio signals according to claim 22; in which said record medium is a magnetic tape, and said first and second heads are driven in a circular path to alternately scan across said tape while the latter is advanced longitudinally so that, in said recording mode of the apparatus, said first and second mixed signals are recorded in alternating parallel record tracks which are skewed relative to said tape.

24. An apparatus for recording and reproducing video and audio signals according to claim 23; further comprising fixed magnetic heads disposed adjacent said magnetic tape and respectively receiving said first and second audio signals to be recorded in respective longitudinal tracks along the tape.

25. An apparatus for recording and reproducing video and audio signals according to claim 24; in which said recording circuit means further comprises switch means for selectively interrupting the application of said FM audio signals to said first and second mixing means so that said first and second audio signals are then recorded only in said longitudinal tracks along the tape.

26. An apparatus for recording and reproducing video and audio signals according to claim 25; in which said video signal is a color video signal which includes luminance and chrominance components; said recording circuit means further comprises frequency converting means for converting said chrominance component to a frequency converted chrominance signal in a relatively low frequency band, additional frequency modulating means for modulating an additional carrier with said luminance component, and control means for said additional frequency modulating means selectively changing the frequency of said additional carrier so that the resulting FM luminance signal is in a band extending upwardly from said band of the frequency converted chrominance signal when said first and second audio signals are to be recorded only in said longitudinal tracks and said frequency of the additional carrier is shifted upwardly to provide a gap between said bands of the FM luminance signal and the frequency converted chrominance signal and in which said first through fourth FM audio signals are situated when said FM audio signals are applied to said mixing means for recording said first and second audio signals in said parallel record tracks skewed relative to the tape.

27. An apparatus for recording and reproducing video and audio signals according to claim 13; in which said combining means includes first switch means connected with said frequency-demodulating means and being operated in synchronism with the alternate reproduction by said first and second head means of said first and second mixed audio and video signals from said first and second record tracks, respectively, for alternately delivering the demodulated portions of said first audio signal, and second switch means also connected with said frequency-demodulating means and operated in synchronism with said alternate reproduction by said first and second head means for alternately delivering the demodulated portions of said second audio signal.

28. An apparatus for recording and reproducing video and audio signals according to claim 27; in which said combining means further includes de-emphasis means having low pass filter means for smoothing transitions between the demodulated portions of said first audio signal and of said second audio signal delivered through said first and second switch means, respectively.

29. In an apparatus for reproducing video and audio signals recorded as first and second mixed signals with different azimuth angles in adjacent first and second parallel tracks, respectively, on a magnetic record medium, and in which said first mixed signal is comprised of a video signal mixed with two carriers of different frequencies frequency modulated by first and second audio signals, respectively, to constitute two FM audio signals, and said second mixed signal is comprised of said video signal mixed with two carriers of frequencies different from each other and from the first-mentioned carriers and frequency-modulated by said first and second audio signals, respectively, to constitute two other FM audio signals; the combination of first and second magnetic head means having different azimuth angles corresponding to said azimuth angles with which said first and second mixed signals are recorded, said first and second magnetic head means scanning said adjacent first and second tracks to alternately reproduce said first and second mixed signals therefrom, means for separating said two FM audio signals from the reproduced first mixed signal, means for separating said two other FM audio signals from the reproduced second mixed signal, frequency-demodulating means receiving the FM audio signals separated from said first and second mixed signals and demodulating therefrom respective alternately reproduced portions of said first and second audio signals, and combining means for sequentially combining said alternately reproduced portions of the first and second audio signals and thereby providing substantially continuous demodulated first and second audio signals.

30. An apparatus according to claim 29; in which said combining means includes first switch means connected with said frequency-demodulating means and being operated in synchronism with the alternate reproduction by said first and second head means of said first and second mixed audio and video signals from said first and second record tracks, respectively, for alternately delivering the demodulated portions of said first audio signal, and second switch means also connected with said frequency-demodulating means and operated in synchronism with said alternate reproduction by said first and second head means for alternately delivering the demodulated portions of said second audio signal.

31. An apparatus according to claim 30; in which said combining means further includes de-emphasis means having low pass filter means for smoothing transitions between the demodulated portions of said first audio signal and of said second audio signal delivered through said first and second switch means, respectively.

32. An apparatus according to claim 29; in which said carriers are first, second, third and fourth carriers having successively increased frequencies, said two FM audio signals mixed with said video signal in said first mixed signal have said first and third carriers, and said other two FM audio signals mixed with said video signal in said second mixed signal have said second and fourth carriers; in which said frequency-demodulating means includes first, second, third and fourth demodulators respectively receiving said FM audio signals with said first, second, third and fourth carriers separated from the reproduced first and second mixed signals; and in which said combining means includes first switch means alternately delivering demodulated audio signals from said first and second demodulators, and second switch means alternately delivering demodulated audio signals from said third and fourth demodulators, each of said switch means being operated in synchronism with the alternate reproduction by said first and second head means of said first and second mixed signals from said first and second adjacent record tracks, respectively.

* * * * *